US008724828B2

(12) United States Patent
Furuta et al.

(10) Patent No.: US 8,724,828 B2
(45) Date of Patent: May 13, 2014

(54) NOISE SUPPRESSION DEVICE

(75) Inventors: Satoru Furuta, Tokyo (JP); Takashi Sudo, Tokyo (JP); Hirohisa Tasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/878,621

(22) PCT Filed: Jan. 19, 2011

(86) PCT No.: PCT/JP2011/000257
§ 371 (c)(1),
(2), (4) Date: Apr. 10, 2013

(87) PCT Pub. No.: WO2012/098579
PCT Pub. Date: Jul. 26, 2012

(65) Prior Publication Data
US 2013/0216058 A1 Aug. 22, 2013

(51) Int. Cl.
*H04B 15/00* (2006.01)

(52) U.S. Cl.
USPC ....... 381/94.1; 381/94.2; 381/94.7; 381/71.1; 704/226; 704/227; 704/228; 379/392.01; 327/551

(58) Field of Classification Search
USPC ............ 381/71.1, 71.12, 94.1, 94.2, 94.7, 56, 381/58, 317, 318; 704/226, 227, 228; 379/392.01; 327/551
See application file for complete search history.

(56) References Cited

U.S. PATENT DOCUMENTS

| | | | | |
|---|---|---|---|---|
| 6,175,602 | B1 | 1/2001 | Gustafsson et al. | |
| 6,717,991 | B1 | 4/2004 | Gustafsson et al. | |
| 2008/0304679 | A1 | 12/2008 | Schmidt et al. | |
| 2010/0207689 | A1 * | 8/2010 | Shimada | 327/551 |

FOREIGN PATENT DOCUMENTS

| | | |
|---|---|---|
| EP | 1 995 722 | 11/2008 |
| JP | 2003 58186 | 2/2003 |
| JP | 2003 140700 | 5/2003 |
| JP | 3459363 | 10/2003 |
| JP | 2005 202222 | 7/2005 |
| JP | 2007 212704 | 8/2007 |
| JP | 2009 038136 | 3/2009 |
| WO | 99 62054 | 12/1999 |

OTHER PUBLICATIONS

Lotter, T. et al., "Speech Enhancement by MAP Spectral Amplitude Estimation Using a Super-Gaussian Speech Model," EURASIP Journal on Applied Signal Processing, vol. 7, pp. 1110 to 1126, (2005).

(Continued)

*Primary Examiner* — Vivian Chin
*Assistant Examiner* — Paul Kim
(74) *Attorney, Agent, or Firm* — Oblon, Spivak, McClelland, Maier & Neustadt, L.L.P.

(57) ABSTRACT

A correction spectrum calculation unit 6 obtains a correction spectrum by smoothing an estimated noise spectrum in accordance with the degree of its variations, and a suppression quantity limiting coefficient calculation unit 7 decides a suppression quantity limiting coefficient from the correction spectrum. A suppression quantity calculation unit 9 obtains a suppression coefficient based on the suppression quantity limiting coefficient, and the spectrum suppression unit 10 carries out amplitude suppression of spectral components of an input signal.

5 Claims, 5 Drawing Sheets

(56) References Cited

OTHER PUBLICATIONS

Ephraim, Y. et al., "Speech Enhancement Using a Minimum Mean-Square Error Short-Time Spectral Amplitude Estimator," IEEE Transactions on Acoustics, Speech, and Signal Processing, vol. ASSP-32, No. 6, pp. 1109 to 1121, (Dec. 1984).

Boll, S.F., "Suppression of Acoustic Noise in Speech Using Spectral Subtraction," IEEE Transactions on Acoustics, Speech, and Signal Processing, vol. ASSP-27, No. 2, pp. 113 to 120, (Apr. 1979).

International Search Report Issued Apr. 19, 2011 in PCT/JP11/00257 Filed Jan. 19, 2011.

* cited by examiner

NOISE SUPPRESSION DEVICE

TECHNICAL FIELD

The present invention relates to a noise suppression device for suppressing background noise superposed on an input signal.

BACKGROUND ART

With the recent development of digital signal processing technology, outdoor voice telephone communication with a mobile phone, in-vehicle hands-free voice telephone communication and hands-free operation using voice recognition have been spread widely. Since devices for carrying out these functions are often used under a very noisy environment, background noise as well as voice is input to a microphone, thereby bringing about deterioration of telephone communication voice and reduction in a voice recognition rate. Accordingly, to realize pleasant voice telephone communication and highly accurate voice recognition, a noise suppression device for reducing background noise mixed into an input signal is required.

As a conventional noise suppression method, a method is known which converts an input signal in the time domain to a power spectrum which is a signal in the frequency domain, calculates a suppression quantity for noise suppression by using the power spectrum of the input signal and a noise spectrum estimated separately from the input signal, carries out amplitude suppression of the power spectrum of the input signal using the suppression quantity obtained, and converts the power spectrum passing through the amplitude suppression and the phase spectrum of the input signal into the time domain to obtain a noise suppressed signal, for example (see Non-Patent Document 1).

The conventional noise suppression method calculates the suppression quantity from the ratio (SN ratio) between the power spectrum of voice and the estimated noise power spectrum. However, it is effective only under a condition in which the noise superposed on the input signal is somewhat steady in the time/frequency direction, but cannot calculate the suppression quantity correctly if noise which is unsteady in the time/frequency direction is input, offering a problem of producing artificial residual rasping noise called a musical tone.

As for the foregoing problem, a method is disclosed, for example, which makes the residual rasping noise less audible by adding an input signal (original sound) passing through an appropriate level adjustment to the output signal after the noise suppression (see Patent Document 1, for example).

As another method, a method is disclosed which sets a prescribed target spectrum in advance to carry out stable noise suppression, reduces the occurrence of musical noise with respect to unsteady noise by controlling the noise suppression quantity in such a manner that the residual noise spectrum approaches the target spectrum, thereby carrying out natural and stable noise suppression (see Patent Document 2, for example).

PRIOR ART DOCUMENT

Patent Document

Patent Document 1: Japanese Patent No. 3459363 (pp. 5-6 and FIG. 1)

Patent Document 2: EP Patent Laid-Open No. 1995722.

Non-Patent Document

Non-Patent Document 1: Y. Ephraim, D. Malah, "Speech Enhancement Using a Minimum Mean-Square Error Short-Time Spectral Amplitude Estimator", IEEE Trans. ASSP, vol. ASSP-32, No. 6 Dec. 1984.

DISCLOSURE OF THE INVENTION

The foregoing methods have the following problems.

The conventional technique described in the Patent Document 1 has a problem of varying a tone color of the output signal or making the voice signal noisy because it adds a prescribed processed signal to the output signal.

Although the conventional technique described in the Patent Document 2 does not have the new problem caused by the conventional technique of the Patent Document 1 because it controls the spectrum of the residual noise after the noise suppression so as to approximates it to the prescribed target spectrum in accordance with the power in a prescribed band, it has the following problem.

FIG. 6 is a diagram schematically illustrating the conventional technique described in the Patent Document 2, in which the vertical axis shows amplitude and horizontal axis shows frequency (0-4000 Hz). In FIG. 6, a dotted line shows an estimated noise spectrum, a dash dotted line shows a prescribed target spectrum, a solid line shows a spectrum of the residual noise which is the output signal after the noise suppression executed by the method of the Patent Document 2, and a broken line shows a spectrum of the residual noise which is obtained without introducing the method of the Patent Document 2, that is, which passes through the suppression by the constant suppression quantity over the entire band. The method of the Patent Document 2 controls the maximum suppression quantity of the noise suppression so that the spectrum level of the residual noise conforms to the amplitude level of the target spectrum. Accordingly, if the shape and power of the target spectrum differ greatly from those of the estimated noise spectrum of the input signal, a band can occur in which the suppression is too much or too little. As a result, a problem of voice distortion and a noisy feeling can occur.

The present invention is implemented to solve the foregoing problems. Therefore it is an object of the present invention to provide a high quality noise suppression device.

Means for Solving the Problems

A noise suppression device in accordance with the present invention has a configuration which calculates a suppression coefficient for noise suppression using spectral components obtained by converting an input signal from a time domain to a frequency domain and using an estimated noise spectrum estimated from the input signal, which carries out amplitude suppression of the spectral components of the input signal using the suppression coefficient, and which generates a noise suppressed signal converted to the time domain, the noise suppression device comprising: a correction spectrum calculation unit for obtaining statistical information reflecting a characteristic of the estimated noise spectrum and for generating a correction spectrum by correcting the estimated noise spectrum in accordance with the statistical information; a suppression quantity limiting coefficient calculation unit for generating a suppression quantity limiting coefficient for defining upper and lower limits of the noise suppression from the correction spectrum the correction spectrum calculation unit generates; and a suppression quantity calculation unit for controlling the suppression coefficient using the suppression quantity limiting coefficient the suppression quantity limiting coefficient calculation unit generates.

Advantages of the Invention

According to the present invention, it obtains the correction spectrum by correcting the noise spectrum estimated from the input signal and executes the limiting processing of the spectral gain using the suppression quantity limiting coefficient obtained from the correction spectrum, thereby being able to provide a high quality noise suppression device capable of carrying out good noise suppression without producing the band in which the suppression is too much or too little while preventing the musical tone from occurring.

BEST MODE FOR CARRYING OUT THE INVENTION

The best mode for carrying out the invention will now be described with reference to the accompanying drawings to explain the present invention in more detail.

Embodiment 1

Figure 1:
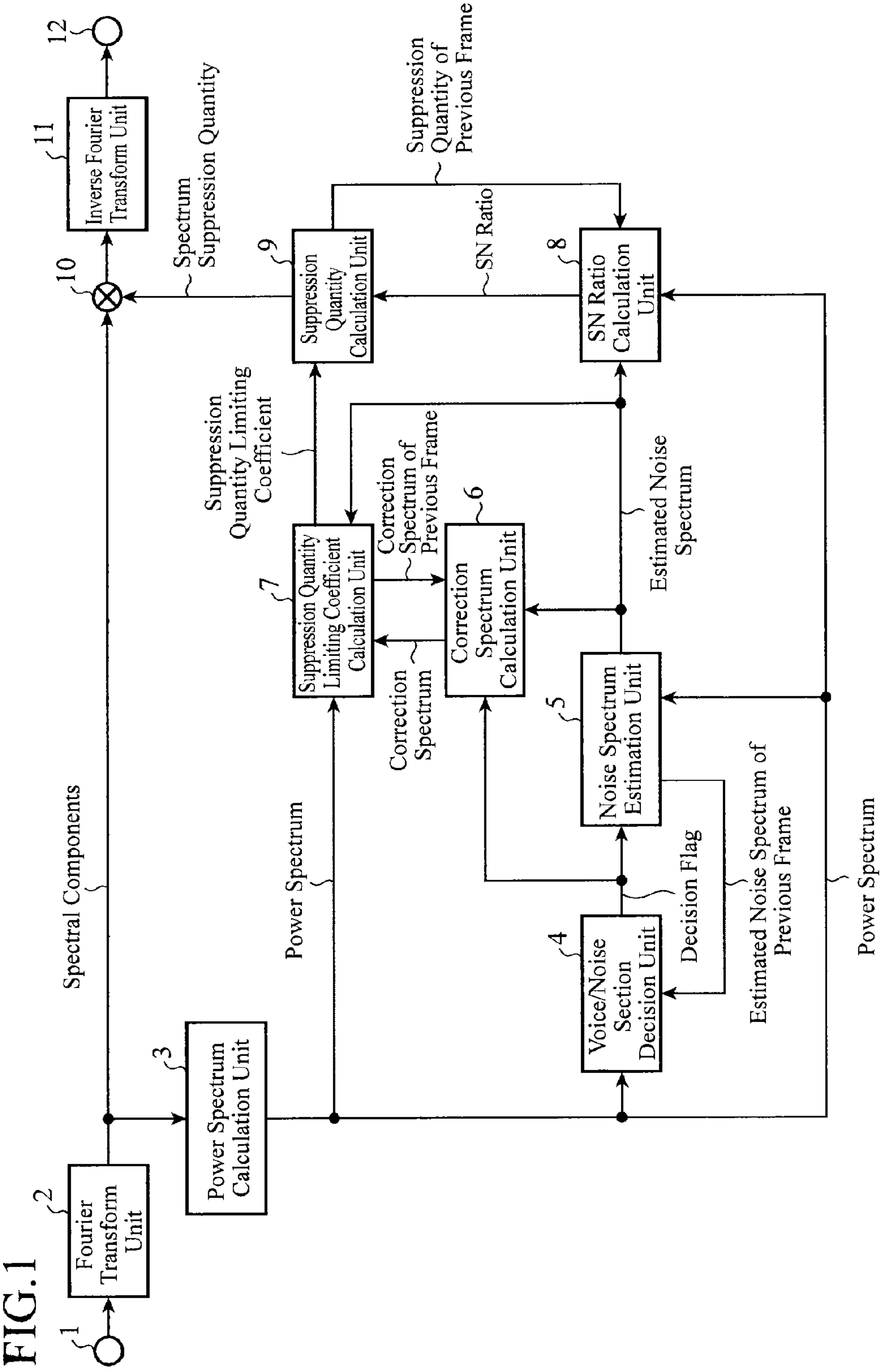
FIG. 1 is a block diagram showing a configuration of a noise suppression device of an embodiment 1 in accordance with the present invention.

The noise suppression device shown in FIG. 1 comprises an input terminal 1, a Fourier transform unit 2, a power spectrum calculation unit 3, a voice/noise section decision unit 4, a noise spectrum estimation unit 5, a correction spectrum calculation unit 6, a suppression quantity limiting coefficient calculation unit 7, an SN ratio calculation unit 8, a suppression quantity calculation unit 9, a spectrum suppression unit 10, an inverse Fourier transform unit 11 and an output terminal 12.

As an input to the noise suppression device, a signal is used which passes through A/D (analog/digital) conversion of voice and music captured with a microphone (not shown), followed by sampling at a prescribed sampling frequency (8 kHz, for example) and by division into a frame unit (10 ms, for example).

The operation principle of the noise suppression device of the embodiment 1 will be described below with reference to FIG. 1.

The input terminal 1 receives the above-mentioned signal, and supplies it to the Fourier transform unit 2 as an input signal.

The Fourier transform unit 2 converts the time domain signal x(t) to spectral components X(λ,k) by applying the Hanning window to the input signal and then by performing the fast Fourier transform of 256 points as shown by the following Expression (1). The spectral components X(λ,k) obtained are supplied to the power spectrum calculation unit 3 and the spectrum suppression unit 10, respectively.

$$X(\lambda,k)=\mathrm{FT}[x(t)] \quad (1)$$

Here, λ is a frame number when the input signal is divided into a frame, k is a number for designating a frequency component in the frequency band of a power spectrum (referred to as "spectrum number" from now on), FT[•] represents Fourier transform, and t represents a discrete time number.

The power spectrum calculation unit 3 calculates a power spectrum Y(λ,k) from the spectral components X(λ,k) of the input signal using the following Expression (2). The power spectrum Y(λ,k) obtained is supplied to the voice/noise section decision unit 4, noise spectrum estimation unit 5, suppression quantity limiting coefficient calculation unit 7 and SN ratio calculation unit 8.

$$Y(\lambda,k)=\sqrt{\mathrm{Re}\{X(\lambda,k)\}^2+\mathrm{Im}\{X(\lambda,k)\}^2};\ 0\le k<128 \quad (2)$$

Here, Re{X(λ,k)} and Im{X(λ,k)} represent real part and imaginary part of the input signal spectrum after the Fourier transform, respectively.

Using as its input the power spectrum Y(λ,k) the power spectrum calculation unit 3 outputs and the estimated noise spectrum N(λ−1,k) which is estimated one frame before and is output by the noise spectrum estimation unit 5 which will be described below, the voice/noise section decision unit 4 decides on whether the input signal of the present frame λ is voice or noise, and outputs the result as a decision flag. The decision flag is supplied to the noise spectrum estimation unit 5 and correction spectrum calculation unit 6.

As the decision method of the voice/noise section by the voice/noise section decision unit 4, a method is known which sets the decision flag Vflag at "1 (voice)" as voice when at least one of the following Expressions (3) and (4) are satisfied, and sets the decision flag Vflag at "0 (noise)" as noise in the other cases.

$$Vflag=\begin{cases}1; & \text{if } 20\cdot\log_{10}(S_{pow}/N_{pow})>TH_{FR\_SN}\\ 0; & \text{if } 20\cdot\log_{10}(S_{pow}/N_{pow})\le TH_{FR\_SN}\end{cases} \quad (3)$$

$$\text{where } S_{pow}=\sum_{k=0}^{127}Y(\lambda,k),\ N_{pow}=\sum_{k=0}^{127}N(\lambda-1,k)$$

$$Vflag=\begin{cases}1; & \text{if } \rho_{max}(\lambda)>TH_{ACF}\\ 0; & \text{if } \rho_{max}(\lambda)\le TH_{ACF}\end{cases} \quad (4)$$

In the foregoing Expression (3), N(λ−1,k) is the estimated noise spectrum of the previous frame, $S_{pow}$ and $N_{pow}$ are the sum total of the power spectrum of the input signal and the sum total of the estimated noise spectrum, respectively. In the foregoing Expression (4), $\rho_{max}(\lambda)$ is the maximum value of the normalized autocorrelation function. Besides, $TH_{FR\_SN}$ and $TH_{ACF}$ are a prescribed constant threshold for decision. Although their appropriate example is $TH_{FR\_SN}$=3.0 and $TH_{ACF}$=0.3, they can be varied appropriately depending on the state of the input signal and the noise level.

Incidentally, in the foregoing Expression (4), the maximum value $\rho_{max}(\lambda)$ of the normalized autocorrelation function can be obtained as follows.

First, using the following Expression (5), the normalized autocorrelation function $\rho_N(\lambda,\tau)$ is obtained from the power spectrum $Y(\lambda,k)$.

$$\rho_N(\lambda,\tau)=\frac{\rho(\lambda,\tau)}{\rho(\lambda,0)} \tag{5}$$

$$\text{where } \rho(\lambda,\tau)=FT[Y(\lambda,k)]$$

Here, τ is a delay time, and FT[•] represents the Fourier transform as mentioned above. For example, the fast Fourier transform at 256 points is enough as in the foregoing Expression (1). Incidentally, since the Expression (5) is the Wiener-Khintchine theorem, the description thereof is omitted here.

After that, using the following Expression (6) can give the maximum value $\rho_{max}(\lambda)$ of the normalized autocorrelation function.

$$\rho_{max}(\lambda)=\max[\rho_N(\lambda,\tau)];\ 16\le\tau\le 96 \tag{6}$$

Here, the foregoing Expression (6) indicates searching for the maximum value of the normalized autocorrelation function $\rho_N(\lambda,\tau)$ in the range of τ=16-96. Incidentally, to analyze the autocorrelation function, a publicly known method like the cepstrum analysis can be used besides the method shown in the foregoing Expression (3).

The noise spectrum estimation unit 5, using as its input the power spectrum $Y(\lambda,k)$ the power spectrum calculation unit 3 outputs and the decision flag Vflag the voice/noise section decision unit 4 outputs, estimates and updates the noise spectrum according to the following Expression (7) and the decision flag Vflag, and outputs the estimated noise spectrum $N(\lambda,k)$ of the present frame. The estimated noise spectrum $N(\lambda,k)$ is supplied not only to the correction spectrum calculation unit 6, suppression quantity limiting coefficient calculation unit 7 and SN ratio calculation unit 8, but also to the voice/noise section decision unit 4 as described above as the estimated noise spectrum $N(\lambda-1,k)$ of the previous frame.

$$N(\lambda,k)=\begin{cases}(1-\alpha)\cdot N(\lambda-1,k)+\alpha\cdot|Y(\lambda,k)|^2 & \text{if } Vflag=0\\ N(\lambda-1,k) & \text{if } Vflag=1\end{cases};\ 0\le k<128 \tag{7}$$

Here, $N(\lambda-1,k)$, which is the estimated noise spectrum in the previous frame, is retained in a storage device (not shown) such as a RAM (Random Access Memory) in the noise spectrum estimation unit 5. In addition, α is the update coefficient which is a prescribed constant in the range of 0<α<1. As a suitable example, although α=0.95, it can be altered appropriately in accordance with the state of the input signal and the noise level.

When the decision flag Vflag=0 in the foregoing Expression (7), since the input signal of the present frame is decided as noise, the noise spectrum estimation unit 5 updates the estimated noise spectrum $N(\lambda-1,k)$ of the previous frame using the power spectrum of the input signal $Y(\lambda,k)$ and the update coefficient α, and outputs as the estimated noise spectrum $N(\lambda,k)$ of the present frame.

In contrast, when the decision flag Vflag=1, since the input signal of the present frame is decided as voice rather than as noise, the estimated noise spectrum $N(\lambda-1,k)$ of the previous frame is output without change as the estimated noise spectrum $N(\lambda,k)$ of the present frame.

The correction spectrum calculation unit 6, using as its input the decision flag Vflag the voice/noise section decision unit 4 outputs and the estimated noise spectrum $N(\lambda,k)$ the noise spectrum estimation unit 5 outputs, calculates the correction spectrum $R(\lambda,k)$ which is necessary for calculating a suppression quantity limiting coefficient that will be described later. The correction spectrum $R(\lambda,k)$ obtained is supplied to the suppression quantity limiting coefficient calculation unit 7.

The correction spectrum $R(\lambda,k)$ is used for determining the frequency characteristic of the suppression quantity limiting coefficient in the suppression quantity limiting coefficient calculation unit 7 that will be described later.

Here, the operation of the correction spectrum calculation unit 6 will be described with reference to FIG. 2.

Figure 2:
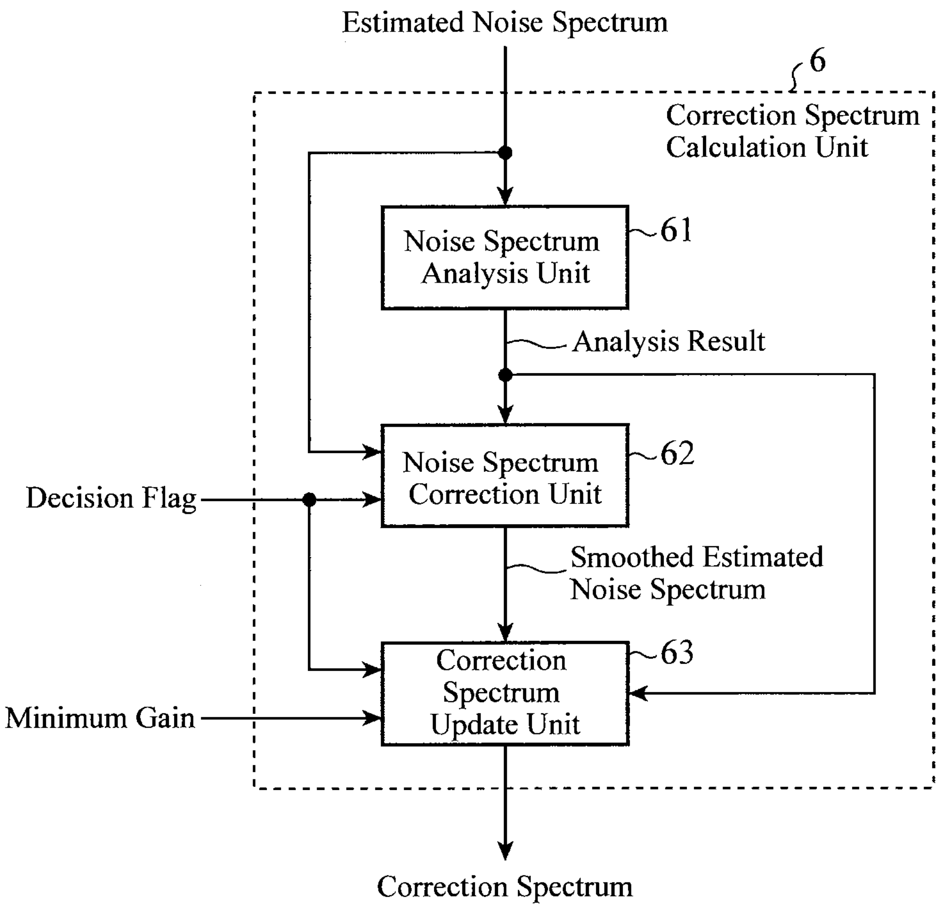
FIG. 2 is a block diagram showing an internal configuration of the correction spectrum calculation unit in the embodiment 1.

The correction spectrum calculation unit 6 shown in FIG. 2 comprises a noise spectrum analysis unit 61, a noise spectrum correction unit 62 and a correction spectrum update unit 63.

The noise spectrum analysis unit 61, using the estimated noise spectrum $N(\lambda,k)$ as its input, analyzes the degree of variations in the estimated noise spectrum. More specifically, it analyzes the degree of unevenness between the spectral components by a statistical technique. As the analysis method of the degree of variations, there is a method of using variance of the spectral components as in the following Expression (8), for example.

$$V(\lambda)=\frac{1}{N}\sum_{k=0}^{N-1}(N_{AVE}(\lambda)-N(\lambda,k))^2 \tag{8}$$

Here, N is the number of spectral components, which is determined at N=128. In addition, $N_{AVE}(\lambda)$ denotes the average of the estimated noise spectrum $N(\lambda)$ of the present frame λ.

Using the foregoing Expression (8), the noise spectrum analysis unit 61 calculates the variance $V(\lambda)$ of the present frame, and supplies it to the noise spectrum correction unit 62 as its analysis result.

The noise spectrum correction unit 62, using as its statistical information the variance $V(\lambda)$ the noise spectrum analysis unit 61 outputs and the decision flag Vflag the voice/noise section decision unit 4 outputs, carries out correction (smoothing) of the estimated noise spectrum $N(\lambda,k)$, and outputs the corrected estimated noise spectrum $N(\lambda,k)$.

To correct the estimated noise spectrum, a median filter as shown in the following Expression (9) is used, for example, and the filter is switched in accordance with the magnitude of the variance $V(\lambda)$. Incidentally, the term "median filter" refers to the processing of rearranging signals in a prescribed region in the order of power and of smoothing by taking its median.

Here, for the convenience of electronic filing, an "" (overline) in the following Expression (9) is expressed by "", which holds true in the Expressions from now on.

$$\overline{N}(\lambda,k)=\begin{cases}F_{sm}[N(\lambda,k),5], & k=1,\ldots N-2, \quad V(\lambda)>V_H \text{ and } Vflag=0\\ F_{sm}[N(\lambda,k),3], & k=2,\ldots N-3, \quad V_H\ge V(\lambda)>V_L \text{ and } Vflag=0\\ N(\lambda,k), & V_L>V(\lambda) \text{ and } Vflag=0\\ N(\lambda-1,k), & Vflag=1\end{cases} \tag{9}$$

Here, $F_{sm}[N(\lambda,k),L]$ denotes a median filter and L designates the size of the region. The degree of smoothing by the median filter increases as the region L increases. In addition, $V_H$ and $V_L$ are prescribed thresholds for switching the filter, and have a relationship $V_H>V_L$. The threshold $V_H$ refers to a case where the variance is large, that is, where the variation of the spectrum is very large. On the other hand, as for the threshold $V_L$, it means that although the variation of its spectrum is not greater than that of the threshold $V_H$ the variation of the spectrum can be found, and that $V_L$ is variable appropriately in accordance with the type and level of each input noise.

In the foregoing Expression (9), L=3, for example, means that the filter processing is executed using three points of the spectrum, that is, the spectral component of interest and its adjacent spectral components, and executes the filter processing for the individual spectral components N(k). With the end terminals N(λ,0) and N(λ,N−1), however, their values are retained without executing the filter processing.

In addition, when the variance V(λ) is small ($V_L>V(\lambda)$), smoothing of the estimated noise spectrum is not executed. In addition, when the decision flag Vflag=1, since the present frame is voice, the smoothed estimated noise spectrum N (λ−1,k) obtained by the previous frame is output. This makes it possible to stop excessive smoothing, and to prevent the voice signal erroneously mixed into the estimated noise spectrum from having an effect on the correction spectrum, thereby being able to carry out good noise suppression.

Incidentally, the smoothed estimated noise spectrum N (λ−1,k) of the previous frame is stored in a storage device (not shown) such as a RAM in the correction spectrum calculation unit 6.

Figure 3:
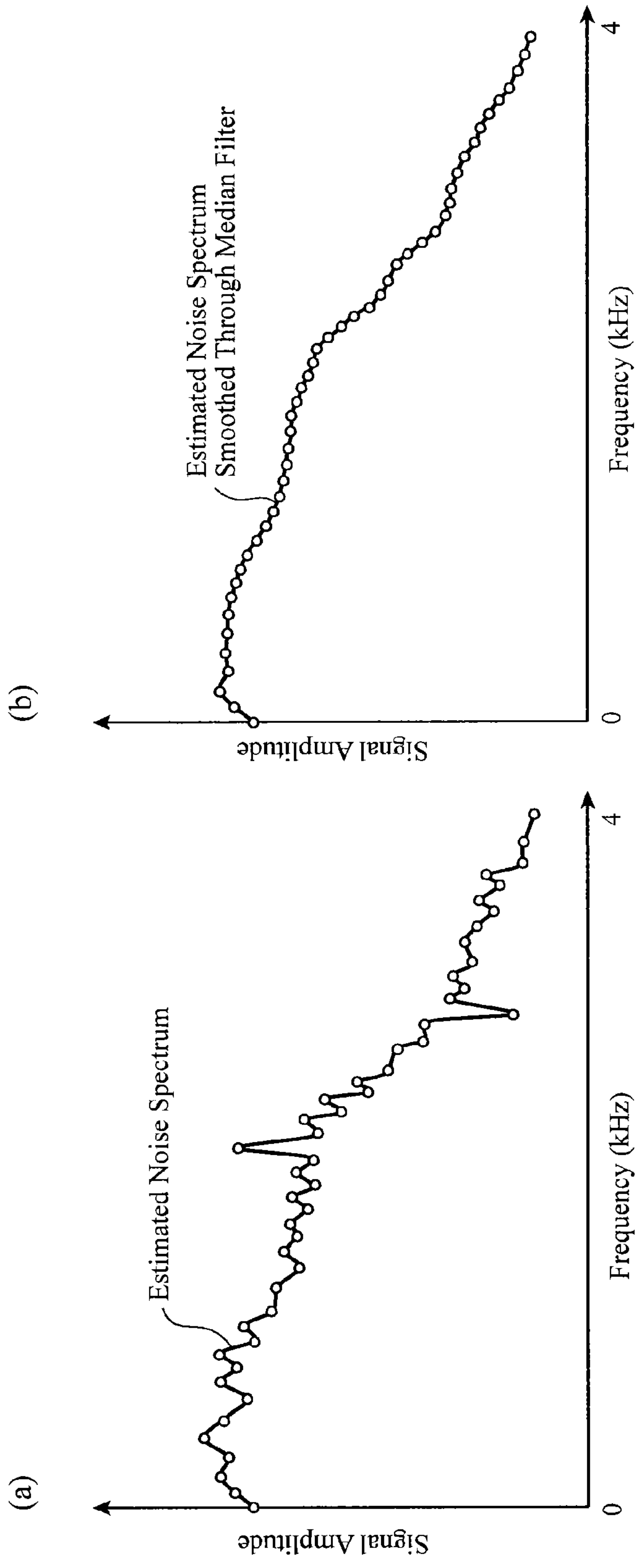
FIG. 3 is a graph schematically showing behavior of smoothing processing in the correction spectrum calculation unit in the embodiment 1, in which FIG. 3(*a*) shows an estimated noise spectrum before smoothing, and FIG. 3(*b*) shows an estimated noise spectrum after smoothing.

FIG. 3 is a diagram schematically showing the processing of the noise spectrum correction unit 62: FIG. 3(*a*) shows the estimated noise spectrum N(λ,k) which is input; and FIG. 3(*b*) shows the smoothed estimated noise spectrum N(λ,k) through the median filter, which is output.

It is found in FIG. 3 that in the smoothed estimated noise spectrum N(λ,k), not only minute unevenness that will cause the rasping musical tones of the residual noise is reduced, but also sharp peaks and troughs are eliminated.

Incidentally, although the foregoing Expression (9) switches the median filter using the variance of the spectrum divided by the two levels $V_H$ and $V_L$ for the convenience of explanation, this is not essential. For example, it is also possible to use a moving average filter or other publicly known smoothing filter as the filter. As for the switching conditions of the filter, further subdivision or continuous alteration is also possible.

In addition, instead of switching the type of the filter in accordance with the variance of the spectrum, it is also possible to enhance smoothing by multiplying the median filter with region L=3 a plurality of times, for example. Furthermore, although the weights of the individual components of the filter processing of the foregoing Expression (9) are equal, they can be different. For example, it is conceivable to give a large weight to the spectral component of interest.

In addition, although the single median filter smoothes all the components in the band of the spectrum in the foregoing Expression (9), it is also possible to use different filters for the individual frequency components or to change the smoothing intensity of the filters. As an example, a configuration is also possible which enhances smoothing as the frequency increases. The configuration can further reduce the unevenness of the high-frequency components with large noise disturbance, thereby being able to achieve better noise suppression.

Incidentally, depending on the type and smoothing intensity of the filter, the power balance between the low-frequency range and high-frequency range of the estimated noise spectrum can vary before and after the smoothing. In this case, it is enough to use a frequency equalizer or emphasis filter to appropriately adjust the slope of the spectrum or the like.

Although the noise spectrum analysis unit 61 employs the variance of the spectrum as the analysis means of the degree of variation in the estimated noise spectrum in the present embodiment 1, this is not essential. For example, it can use a publicly known analysis means such as spectral entropy, or a combination of a plurality of methods. As for the filter switching thresholds in this case, they can be adjusted appropriately in accordance with the analysis means to be used or the analysis means to be combined.

In addition, although the present embodiment 1 carries out smoothing control of the spectrum by detecting the variance of the spectrum, that is, the variation in the frequency direction, it is also possible to take account of the variation in the time direction. For example, a configuration is also conceivable which calculates difference in the power between the previous frame and the present frame, and carries out smoothing if the difference is greater than a prescribed threshold.

The correction spectrum update unit 63 generates and outputs the correction spectrum R(λ,k) by using as its input the analysis result the noise spectrum analysis unit 61 outputs (the variance of the spectrum V(λ)), the smoothed estimated noise spectrum N(λ,k) the noise spectrum correction unit 62 outputs, the decision flag Vflag the voice/noise section decision unit 4 outputs, the correction spectrum R(λ−1,k) of the previous frame the suppression quantity limiting coefficient calculation unit 7 outputs which will be described later, and a prescribed minimum gain (a maximum suppression quantity in the noise suppression) GMIN a user sets arbitrarily.

The correction spectrum R(λ,k) is generated according to the following Expression (10).

$$R(\lambda,k)=\begin{cases}\alpha\cdot R(\lambda-1,k)+(1-\alpha)\cdot GMIN\cdot\overline{N}(\lambda,k), & Vflag=0\\ R(\lambda-1,k), & Vflag=1\end{cases};\quad k=0,\ldots N-1 \tag{10}$$

Here, α is a prescribed interframe smoothing coefficient. Although α=0.9 is an appropriate value, it is also possible to alter the value α in accordance with the variance V(λ). For example, as for the large variance, a small α makes it possible to increase the updating speed of the correction spectrum, thereby enabling it to follow rapid changes in the noise in the input signal. In addition, since the decision flag Vflag=1 does not designate noise but voice, the update of the correction spectrum is stopped by outputting the correction spectrum R(λ−k,k) of the previous frame.

Incidentally, the correction spectrum R(λ−1,k) of the previous frame is stored in a storage device (not shown) such as a RAM in the suppression quantity limiting coefficient calculation unit 7.

Incidentally, in the foregoing Expression (10), the interframe smoothing coefficient α can be set at different values for the individual frequencies. For example, it can be reduced as the frequency increases from the low-frequency range to high-frequency range to increase the updating speed of the high-frequency component with large frequency/time variations.

In FIG. 1, the suppression quantity limiting coefficient calculation unit 7, using as its input the correction spectrum R(λ−1,k) the correction spectrum calculation unit 6 outputs, the power spectrum Y(λ,k) the power spectrum calculation unit 3 outputs and the minimum gain GMIN which is a prescribed value the user sets in the same manner as in the correction spectrum update unit 63 of FIG. 2, revises the gain of the correction spectrum R(λ,k) so as to conform to the estimated noise spectrum N(λ,k) in the present frame, and outputs the result as the suppression quantity limiting coefficient $G_{floor}(\lambda,k)$. The suppression quantity limiting coefficient $G_{floor}(\lambda,k)$ obtained is supplied to the suppression quantity calculation unit 9.

Here, the operation of the suppression quantity limiting coefficient calculation unit 7 will be described with reference to FIG. 4.

Figure 4:
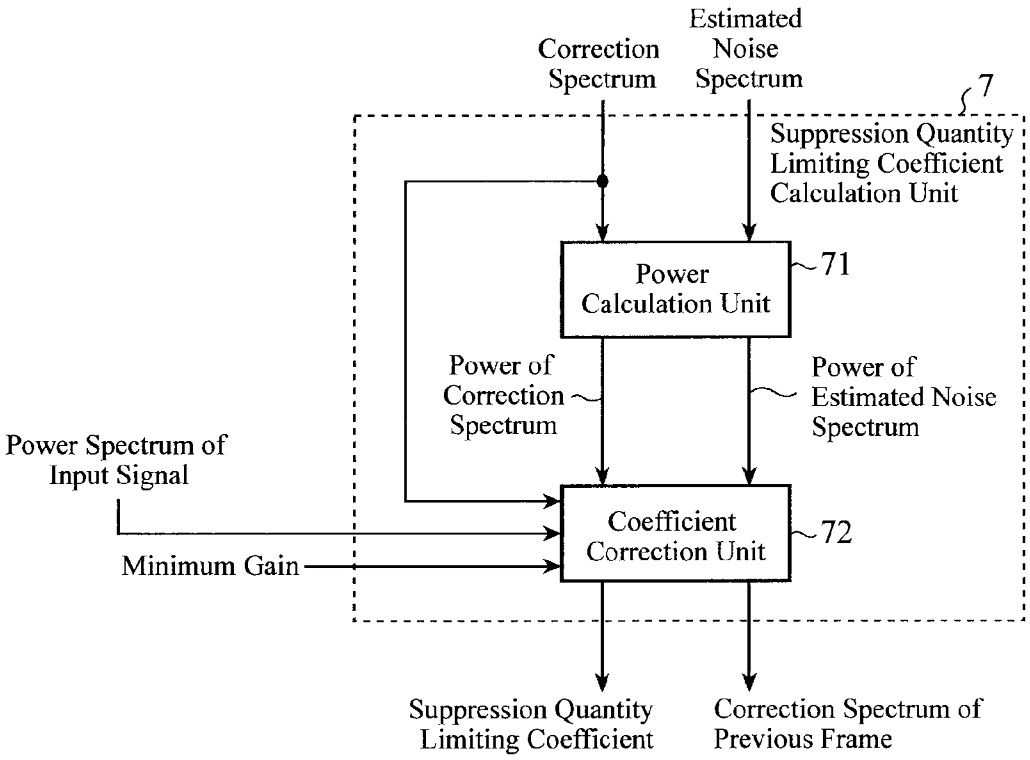
FIG. 4 is a block diagram showing an internal configuration of the suppression quantity limiting coefficient calculation unit in the embodiment 1.

The suppression quantity limiting coefficient calculation unit 7 shown in FIG. 4 comprises a power calculation unit 71 and a coefficient correction unit 72.

According to the following Expression (11), the power calculation unit 71 calculates the power $POW_R(\lambda)$ of the correction spectrum R(λ,k) the correction spectrum calculation unit 6 outputs and the power $POW_N(\lambda)$ of the estimated noise spectrum N(λ,k) the noise spectrum estimation unit 5 outputs. The power $POW_R(\lambda)$ and $POW_N(\lambda)$ are supplied to the coefficient correction unit 72.

$$POW_R(\lambda) = \frac{1}{N}\sum_{k=0}^{N-1}(R(\lambda,k))^2 \qquad (11)$$

$$POW_N(\lambda) = \frac{1}{N}\sum_{k=0}^{N-1}(N(\lambda,k))^2$$

Here, the $POW_R(\lambda)$ is the power of the correction spectrum R(λ,k) of the present frame, and the $POW_N(\lambda)$ is the power of the estimated noise spectrum N(λ,k) of the present frame, where N=128.

According to the following Expression (12), the coefficient correction unit 72 compares the power $POW_R(\lambda)$ of the correction spectrum with the value obtained by multiplying the power $POW_N(\lambda)$ of the estimated noise spectrum by the minimum gain GMIN, and determines the revising quantity D(λ) of the correction spectrum R(λ,k) in accordance with the compared result.

$$D(\lambda) = \begin{cases} D_{UP}, & \text{if} \quad POW_R(\lambda) < GMIN \cdot POW_N(\lambda) \\ D_{DOWN}, & \text{else} \end{cases} \qquad (12)$$

Here, $D_{UP}$ and $D_{DOWN}$ are a prescribed constant, and although they are preferably $D_{UP}$=1.05 and $D_{DOWN}$=0.95 in the present embodiment 1, they can be altered appropriately in accordance with the type of noise and noise level. In addition, the values $D_{UP}$ and $D_{DOWN}$ are not limited to a single value each, but can have a plurality of values to determine the revising quantity D(λ). For example, although the foregoing Expression (12) determines the revising quantity D(λ) by only comparing the power, when the power difference is greater (or smaller) than a prescribed threshold, a greater revising quantity can be set by placing $D_{UP}$=1.2 (or $D_{DOWN}$=0.8 when smaller). Thus altering the revising quantity D(λ) in accordance with the power difference makes it possible to reduce the correction error and to increase the correction speed.

Incidentally, although the present embodiment 1 obtains the power over the entire band by the foregoing Expression (11), this is not essential. For example, it is also possible to obtain the power in a part of the band such as 200 Hz-800 Hz, and to make comparison by the foregoing Expression (12).

After that, according to the following Expression (13), the coefficient correction unit 72 revises the gain of the correction spectrum R(λ,k) using the revising quantity D(λ) obtained, and obtains a gain-revised correction spectrum R^(λ,k). The gain-revised correction spectrum R^(λ,k) is supplied to the correction spectrum calculation unit 6 which handles it as the correction spectrum R(λ−1,k) of the previous frame.

Incidentally, for the convenience of electronic filing, "^" (hat mark) in the following Expression (13) is denoted as "^", which holds true in the Expressions from now on.

$$\hat{R}(\lambda,k) = D(\lambda)\cdot R(\lambda,k);\ k=0, \ldots, N-1 \qquad (13)$$

Finally, the coefficient correction unit 72, using as its input the gain-revised correction spectrum R^(λ,k) and the power spectrum Y(λ,k) of the input signal the power spectrum calculation unit 3 outputs, calculates the suppression quantity limiting coefficient $G_{floor}(\lambda,k)$ by the following Expression (14) and Expression (15). The following Expression (14) is an expression for determining the upper limit and lower limit of the suppression quantity, and the following Expression (15) is an expression for carrying out interframe smoothing of the suppression quantity limiting coefficient. The suppression quantity limiting coefficient $G_{floor}(\lambda,k)$ obtained is supplied to the suppression quantity calculation unit 9.

$$\hat{G}_{floor}(\lambda,k) = \min(\max(GMIN, \hat{R}(\lambda,k)/Y(\lambda,k)), GMAX),\ k=0, \ldots, N-1 \qquad (14)$$

$$G_{floor}(\lambda,k) = \beta\cdot\hat{G}_{floor}(\lambda-1,k) + (1-\beta)\cdot\hat{G}_{floor}(\lambda,k),\ k=0, \ldots, N-1 \qquad (15)$$

Here, GMAX is the maximum gain, that is, a prescribed constant not greater than one, which becomes the minimum suppression quantity of the noise suppression device. In addition, β denotes a prescribed smoothing coefficient, and β=0.1 is appropriate.

In FIG. 1, the SN ratio calculation unit 8, using as its input the power spectrum Y(λ,k) the power spectrum calculation unit 3 outputs, the estimated noise spectrum N(λ,k) the noise spectrum estimation unit 5 outputs and the spectrum suppression quantity G(λ−1,k) of the previous frame the suppression quantity calculation unit 9 outputs which will be described later, calculates a posteriori SNR and a priori SNR for each spectral component.

The a posteriori SNR γ(λ,k) can be obtained by the following Expression (16) using the power spectrum Y(λ,k) and estimated noise spectrum N(λ,k).

$$\gamma(\lambda,k) = \frac{|Y(\lambda,k)|^2}{N(\lambda,k)} \qquad (16)$$

In addition, the a priori SNR ξ(λ,k) can be obtained by the following Expression (17) using the spectrum suppression quantity G(λ−1,k) of the previous frame and the a posteriori SNR γ(λ−1,k) of the previous frame.

$$\xi(\lambda,k) = \delta\cdot\gamma(\lambda-1,k)\cdot G^2(\lambda-1,k) + (1-\delta)\cdot F[\gamma(\lambda,k)-1] \qquad (17)$$

where $$F[x] = \begin{cases} x, & x > 0 \\ 0, & \text{else} \end{cases}$$

Here, δ is a forgetting coefficient which is a prescribed constant in the range of $0<\delta<1$, and $\delta=0.98$ is appropriate in the present embodiment 1. In addition, F[•] denotes half-wave rectification, which brings the a posteriori SNR γ(λ,k) to flooring to zero when it is negative in terms of decibel.

The a posteriori SNR γ(λ,k) and a priori SNR ξ(λ,k) obtained are supplied to the suppression quantity calculation unit 9.

The suppression quantity calculation unit 9, using as its input the a priori SNR ξ(λ,k) and a posteriori SNR γ(λ,k) the SN ratio calculation unit 8 outputs and the suppression quantity limiting coefficient $G_{floor}(\lambda,k)$ the suppression quantity limiting coefficient calculation unit 7 outputs, obtains the spectrum suppression quantity G(λ,k) which is noise suppression quantity of each spectrum component. The spectrum suppression quantity G(λ,k) is supplied to the spectrum suppression unit 10.

As a method of obtaining the spectrum suppression quantity G(λ,k) by the suppression quantity calculation unit 9, Joint MAP (Maximum A Posteriori) estimator can be applied, for example. The Joint MAP estimator, which is a method of estimating the spectrum suppression quantity G(λ,k) on the assumption that the noise signal and voice signal have Gaussian distribution, obtains the amplitude spectrum and phase spectrum that will maximize a conditional probability density function using the a priori SNR ξ(λ,k) and a posteriori SNR γ(λ,k), and utilizes the values obtained as an estimator. In the configuration, the spectrum suppression quantity G(λ,k) can be given by the following Expression (18) using ν and μ as parameters that will determine the shape of the probability density function.

$$\hat{G}(\lambda,k)=u(\lambda,k)+\sqrt{u^2(\lambda,k)+\frac{v}{2\gamma(\lambda,k)}} \quad (18)$$

$$\text{where } u(\lambda,k)=\frac{1}{2}-\frac{\mu}{4\sqrt{\gamma(\lambda,k)\xi(\lambda,k)}}$$

After obtaining a temporary spectrum suppression quantity G^(λ,k) by the foregoing Expression (18), the suppression quantity calculation unit 9 executes limiting of the minimum value (flooring processing) of the spectral gain using the suppression quantity limiting coefficient $G_{floor}(\lambda,k)$ and the following Expression (19), and obtains the spectrum suppression quantity G(λ,k).

$$G(\lambda,k)=\max(\hat{G}(\lambda,k),G_{floor}(\lambda,k)) \quad (19)$$

Incidentally, as for the details of the spectrum suppression quantity deriving process in the Joint MAP estimator, refer to "T. Lotter, P. Vary, "Speech Enhancement by MAP Spectral Amplitude Estimation Using a Super-Gaussian Speech Model", EURASIP Journal on Applied Signal Processing, pp. 1110-1126, No. 7, 2005", and its explanation will be omitted here.

The spectrum suppression unit 10, using as its input the spectrum suppression quantity G(λ,k) the suppression quantity calculation unit 9 outputs, obtains a noise-suppressed voice signal spectrum S(λ,k) by suppressing the spectral components X(λ,k) of the input signal for each spectrum according to the following Expression (20). The voice signal spectrum S(λ,k) obtained is supplied to the inverse Fourier transform unit 11.

$$S(\lambda,k)=G(\lambda,k)\cdot X(\lambda,k) \quad (20)$$

The inverse Fourier transform unit 11 carries out the inverse Fourier transform using the voice signal spectrum S(λ,k) the spectrum suppression unit 10 outputs and the phase spectrum of the voice signal, followed by superposing on the output signal of the previous frame and then by supplying the noise suppressed voice signal s(t) to the output terminal 12.

The output terminal 12 outputs the noise suppressed voice signal s(t) to the outside.

Figure 5:
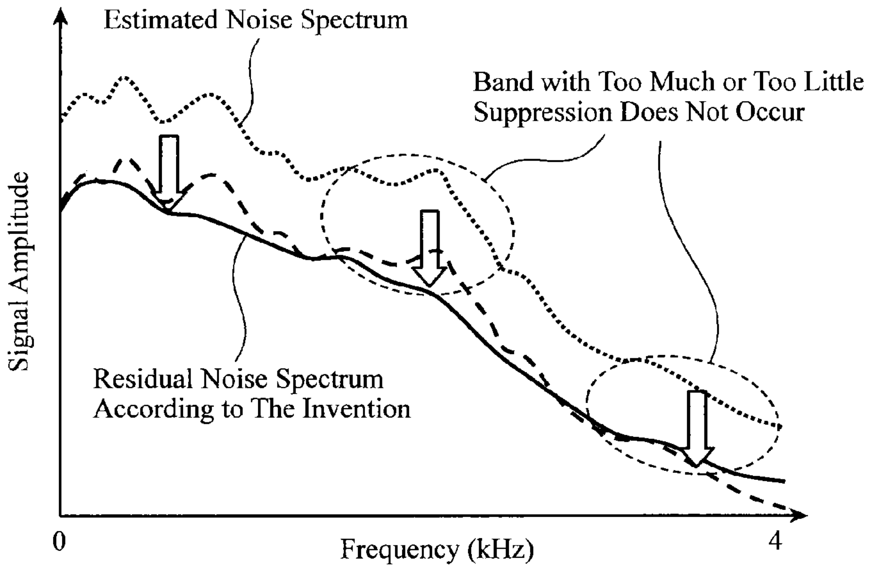
FIG. 5 is a graph schematically showing behavior of a residual noise spectrum after the noise suppression by the noise suppression device of the embodiment 1.
Figure 6:
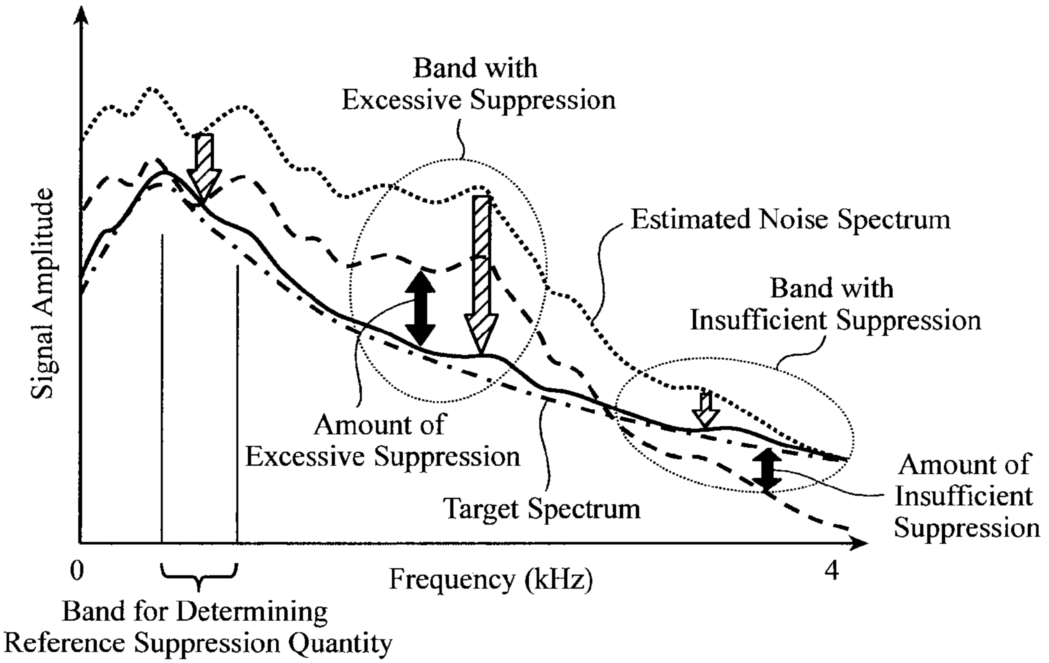
FIG. 6 is a graph schematically showing behavior of a residual noise spectrum after the noise suppression by a noise suppression method of the Patent Document 2.

FIG. 5 is a diagram schematically showing an example of the residual noise spectrum (that is, the voice signal spectrum S(λ,k)), which is the output signal of the noise suppression device of the present embodiment 1. As in FIG. 6 described before, the dotted line shows the estimated noise spectrum, and the broken line shows the residual noise spectrum which passes through the suppression by the constant suppression quantity over the entire band. In contrast with this, the solid line shows the residual noise spectrum passing through the noise suppression by the noise suppression device of the present embodiment 1.

As for driving noise observed in actual noise environment such as in a vehicle during traveling, since it can have complex peaks due to wind noise and engine acceleration noise, it usually does not have a simple steadily declining shape. When such noise is mixed into the input signal, the conventional method (shown by the solid line in FIG. 6) determines the whole suppression quantity in such a manner that the residual noise after the noise suppression processing agrees with the prescribed target spectrum, thereby bringing out a case where a band appears in which the suppression is too much or too little. In contrast with this, since the method of the present embodiment 1 (shown by the solid line in FIG. 5) calculates the suppression quantity limiting coefficient $G_{floor}(\lambda,k)$ from the noise spectrum N(λ,k) estimated from the input signal and executes the limiting processing of the spectral gain using the coefficient, it can prevent the musical tones and peak components and troughs (unevenness) causing a strange sound from remaining such as when the suppression quantity is fixed (shown by the broken lines in FIG. 5 and FIG. 6), and can prevent the occurrence of the band in which the suppression is too much or too little, thereby being able to carry out good noise suppression.

As described above, according to the embodiment 1, the noise suppression device comprises: the Fourier transform unit 2 for converting the input signal in the time domain to the spectral components in the frequency domain; the power spectrum calculation unit 3 for calculating the power spectrum from the spectral components; the voice/noise section decision unit 4 for deciding the noise section of the input signal; the noise spectrum estimation unit 5 for estimating the noise spectrum from the input signal in the noise section; the correction spectrum calculation unit 6 for generating the correction spectrum by obtaining the variance indicating the degree of variations of the estimated noise spectrum and by correcting the estimated noise spectrum in accordance with the variance and the decision result of the voice/noise section; the suppression quantity limiting coefficient calculation unit 7 for generating the suppression quantity limiting coefficient that defines the upper and lower limits of the noise suppression from the correction spectrum; the SN ratio calculation unit 8 for calculating the SN ratio of the estimated noise spectrum; the suppression quantity calculation unit 9 for controlling the suppression coefficient using the SN ratio and suppression quantity limiting coefficient; the spectrum suppression unit 10 for carrying out amplitude suppression of the spectral components of the input signal using the suppression coefficient; and the inverse Fourier transform unit 11 for generating the noise suppressed signal by converting the amplitude suppressed spectral components into the time domain. Accordingly, it can provide a high quality noise suppression device capable of carrying out good noise suppression without producing the band in which the suppression is too much or too little while preventing the musical tone from occurring.

In addition, according to the embodiment 1, the correction spectrum calculation unit 6 controls the correction quantity by changing the filter or altering the number of times of the processing in accordance with the variance of the estimated noise spectrum, thereby being able to perform good noise suppression.

Incidentally, as the correction processing of the estimated noise spectrum, it is possible to execute at least one of the frequency direction smoothing and interframe smoothing. The correction by the frequency direction smoothing can reduce the unevenness of the individual frequencies of noise, thereby being able to prevent the occurrence of the musical tones. In addition, the correction by the interframe smoothing enables following sudden changes of noise in the input signal. Accordingly, it can achieve better noise suppression.

In addition, according to the embodiment 1, the correction spectrum calculation unit 6 stops the correction of the estimated noise spectrum when the variance of the estimated noise spectrum is not greater than the prescribed threshold, or stops the correction when the voice/noise section decision unit 4 makes a decision of the voice section. Accordingly, it can not only stop excessive smoothing but also prevent the voice signal erroneously mixed into the estimated noise spectrum from having an adverse effect on the correction spectrum, thereby being able to achieve better noise suppression.

In addition, according to the embodiment 1, the correction spectrum calculation unit 6 can further reduce the unevenness of the high-frequency component in which more noise can occur by applying correction which increases its smoothing with the frequency to the estimated noise spectrum, thereby being able to achieve better noise suppression.

Furthermore, reducing the updating speed of the correction spectrum from the low-frequency range toward the high-frequency range makes it possible to increase the updating speed of the high-frequency component in which changes in frequency and time are large, thereby being able to achieve better noise suppression.

Incidentally, although in the foregoing embodiment 1 the correction spectrum calculation unit 6 generates the correction spectrum using the smoothed estimated noise spectrum in accordance with the foregoing Expression (10), a configuration is also possible, for example, which learns and retains a prescribed correction spectrum in advance, and uses the prescribed correction spectrum which is learned in advance as the input instead of the smoothed estimated noise spectrum in the initial state of the operation and in the case where the noise in the input signal changes suddenly. The configuration can increase the speed of learning and convergence of the correction spectrum in the initial state and in the case where the input signal changes suddenly, thereby being able to limit quality changes in the output signal to a minimum.

In addition, it is also possible to always mix the prescribed correction spectrum, which has been learned in advance, by a small amount into the correction spectrum obtained by the foregoing Expression (10). Mixing the prescribed correction spectrum by a small amount can suppress overlearning of the correction spectrum (can enable forgetting the correction spectrum gradually), thereby being able to achieve better noise suppression.

In addition, although the foregoing embodiment 1 is described by way of example employing the maximum a Posteriori estimator (MAP estimator) as a method of noise suppression by the suppression quantity calculation unit 9 and spectrum suppression unit 10, it is not limited to the method, but is applicable to a case that employs other methods. For example, there is a minimum mean-square error short-time spectral amplitude estimator described in detail in the Non-Patent Document 1, and spectral subtraction described in detail in S. F. Boll, "Suppression of Acoustic Noise in Speech Using Spectral Subtraction" (IEEE Trans. on ASSP, Vol. 27, No. 2, pp. 113-120, April 1979).

In addition, although the foregoing embodiment 1 carries out the suppression quantity control over the entire band of the input signal, this is not essential. For example, it is also possible to control only the low-frequency range or high-frequency range as necessary, or to control only a particular frequency band such as about 500-800 Hz. The suppression quantity control for the limited frequency band is effective for narrow-band noise such as wind noise and car engine noise.

Furthermore, although the example shown in the drawings is described about the narrow-band telephone (0-4000 Hz), the noise suppression is not limited to the narrow-band telephone voice, but is also applicable to a broad-band telephone voice of 0-8000 Hz and to an acoustic signal.

In addition, although the voice signal passing through the noise suppression in the foregoing embodiment 1 can be delivered to various acoustic processing devices such as a voice encoder device, voice recognition device, voice storage device and hands-free telephone communication device in a digital data format, the noise suppression device of the embodiment 1 can also be realized individually or as a combination with the other device mentioned above by a DSP (digital signal processor) or by executing software programs. The programs can be stored in a storage unit of a computer executing the software programs or can take a form of a storage medium to be distributed such as a CD-ROM. In addition, the programs can be provided through a network. In addition, the noise suppressed voice signal can be delivered not only to various acoustic processing devices but also to an amplifier after D/A (digital/analog) conversion to be output directly from a speaker as a voice signal.

Besides the foregoing, variations of any components of the embodiment or removal of any components of the embodiment is possible within the scope of the present invention.

Industrial Applicability

As described above, a noise suppression device in accordance with the present invention can achieve high quality noise suppression. Accordingly, it is suitable for improving sound quality of a voice communication system such as a car navigation system, a mobile phone and an intercom, and of a hands-free telephone communication system, a videoconference system and monitoring system, to which the voice communication/voice storage/voice recognition system is introduced, and for improving the recognition rate of a voice recognition system.

Description of Reference Symbols

1 input terminal; 2 Fourier transform unit; 3 power spectrum calculation unit; 4 voice/noise section decision unit; 5 noise spectrum estimation unit; 6 correction spectrum calculation unit; 7 suppression quantity limiting coefficient calculation unit; 8 SN ratio calculation unit; 9 suppression quantity calculation unit; 10 spectrum suppression unit; 11 inverse Fourier transform unit; 12 output terminal; 61 noise spectrum analysis unit; 62 noise spectrum correction unit; 63 correction spectrum update unit; 71 power calculation unit; 72 coefficient correction unit.

What is claimed is:

1. A noise suppression device which calculates a suppression coefficient for noise suppression using spectral components obtained by converting an input signal from a time domain to a frequency domain and using an estimated noise spectrum estimated from the input signal, which carries out amplitude suppression of the spectral components of the input signal using the suppression coefficient, and which generates a noise suppressed signal converted to the time domain, the noise suppression device comprising:

a correction spectrum calculator that obtains statistical information reflecting a characteristic of the estimated noise spectrum and that generates a correction spectrum by correcting the estimated noise spectrum in accordance with the statistical information;

a suppression quantity limiting coefficient calculator that generates a suppression quantity limiting coefficient for defining upper and lower limits of the noise suppression from the correction spectrum the correction spectrum calculator generates; and a suppression quantity calculator that controls the suppression coefficient using the suppression quantity limiting coefficient the suppression quantity limiting coefficient calculator generates.

2. The noise suppression device according to claim 1, wherein the correction spectrum calculator controls a correction quantity of the estimated noise spectrum in accordance with a value of the statistical information.

3. The noise suppression device according to claim 1, wherein the correction spectrum calculator stops correction of the estimated noise spectrum when a value of the statistical information is not greater than a prescribed threshold.

4. The noise suppression device according to claim 1, wherein the correction spectrum calculator applies correction of at least one of frequency direction smoothing and inter-frame smoothing to the estimated noise spectrum.

5. The noise suppression device according to claim 1, wherein the correction spectrum calculator carries out correction that enhances smoothing with an increase of frequency to the estimated noise spectrum.

* * * * *